(12) United States Patent
Chalishazar et al.

(10) Patent No.: US 7,894,816 B1
(45) Date of Patent: Feb. 22, 2011

(54) METHOD OF SELECTING CARRIER FREQUENCY FOR CALL ORIGINATION

(75) Inventors: Nandish M. Chalishazar, Lenexa, KS (US); Hector M. Ribas, Overland Park, KS (US); Jason Sigg, Olathe, KS (US); Meng Y. Yew, Lenexa, KS (US); Abhijit V. Apte, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 760 days.

(21) Appl. No.: 11/848,035

(22) Filed: Aug. 30, 2007

Related U.S. Application Data

(62) Division of application No. 11/081,272, filed on Mar. 16, 2005, now Pat. No. 7,302,265.

(51) Int. Cl.
*H04W 36/00* (2009.01)
(52) U.S. Cl. .............. 455/439; 455/436; 455/442; 455/445; 370/331; 370/342; 370/338; 370/328
(58) Field of Classification Search .......... 455/450, 455/434, 439, 436, 442, 445; 370/331, 342, 370/338, 328
See application file for complete search history.

(56) References Cited

U.S. PATENT DOCUMENTS

| | | | |
|---|---|---|---|
| 5,267,261 A | 11/1993 | Blakeney et al. |
| 5,640,414 A | 6/1997 | Blakeney et al. |
| 5,649,000 A | 7/1997 | Lee et al. |
| 5,848,063 A | 12/1998 | Weaver et al. |
| 5,883,899 A | 3/1999 | Dahlman et al. |
| 5,889,768 A | 3/1999 | Storm et al. |
| 5,940,761 A | 8/1999 | Tiedemann et al. |
| 5,995,498 A | 11/1999 | Toot et al. |
| 5,999,816 A | 12/1999 | Tiedemann et al. |

(Continued)

FOREIGN PATENT DOCUMENTS

WO 2004/112269 A1 12/2004

OTHER PUBLICATIONS

Akira Yamaguchi, et al., "Multi Carrier Forward Link Packet Scheduler for High-Speed Packet Data System," Proc. of IEEE PIMRC '02, Sep. 2002, pp. 2160-2164, vol. 5.

(Continued)

*Primary Examiner*—Ajit Patel
*Assistant Examiner*—Khai M Nguyen

(57) ABSTRACT

A mobile station in an idle state is associated with a current sector-carrier that has a current pilot channel at a current carrier frequency. In response to a request to originate a call, the mobile station compares its current sector-carrier with one or more candidate sector-carriers that have pilot channels at carrier frequencies distinct from the current carrier frequency. The mobile station measures received signal strengths of the current carrier frequency and the one or more candidate carrier frequencies and measures pilot signal levels of the current pilot channel and the one or more candidate pilot channels. If a candidate sector-carrier has a carrier frequency with a received signal strength that exceeds that of the current sector-carrier, and has a pilot channel with a pilot signal level that exceeds that of the current sector-carrier, the mobile station uses that candidate sector-carrier to transmit a call origination message.

7 Claims, 5 Drawing Sheets

U.S. PATENT DOCUMENTS

| | | | |
|---|---|---|---|
| 6,021,122 | A | 2/2000 | Tiedemann et al. |
| 6,021,123 | A | 2/2000 | Mimura |
| 6,038,448 | A | 3/2000 | Chheda et al. |
| 6,047,191 | A | 4/2000 | Desgagne |
| 6,069,880 | A | 5/2000 | Owen et al. |
| 6,073,021 | A | 6/2000 | Kumar et al. |
| 6,075,990 | A | 6/2000 | Shin |
| 6,078,570 | A | 6/2000 | Czaja et al. |
| 6,097,954 | A | 8/2000 | Kumar et al. |
| 6,178,164 | B1 | 1/2001 | Wang et al. |
| 6,181,943 | B1 | 1/2001 | Kuo et al. |
| 6,195,551 | B1 | 2/2001 | Kim et al. |
| 6,216,004 | B1 | 4/2001 | Tiedemann et al. |
| 6,304,755 | B1 | 10/2001 | Tiedemann et al. |
| 6,327,471 | B1 | 12/2001 | Song |
| 6,337,984 | B1 * | 1/2002 | Hong et al. .................. 455/439 |
| 6,400,951 | B1 | 6/2002 | Vaara |
| 6,400,952 | B2 | 6/2002 | Kim et al. |
| 6,430,414 | B1 | 8/2002 | Sorokine et al. |
| 6,434,387 | B1 | 8/2002 | Lee |
| 6,532,221 | B1 | 3/2003 | Kim et al. |
| 6,546,248 | B1 | 4/2003 | Jou et al. |
| 6,567,646 | B1 | 5/2003 | Eklof et al. |
| 6,574,203 | B2 | 6/2003 | Bernstein et al. |
| 6,603,971 | B1 | 8/2003 | Mohebbi |
| 6,606,497 | B2 | 8/2003 | Mohebbi |
| 6,625,132 | B1 | 9/2003 | Boettger et al. |
| 6,636,735 | B2 | 10/2003 | Mohebbi |
| 6,658,252 | B2 | 12/2003 | Mohebbi |
| 6,662,019 | B2 | 12/2003 | Kamel et al. |
| 6,721,564 | B1 | 4/2004 | Kobayashi |
| 6,728,538 | B2 | 4/2004 | Jou et al. |
| 6,748,215 | B1 * | 6/2004 | Chen et al. .................. 455/434 |
| 6,771,963 | B1 | 8/2004 | Cheng et al. |
| 6,873,826 | B2 | 3/2005 | Becker |
| 6,954,643 | B2 | 10/2005 | Petrus |
| 7,050,802 | B2 | 5/2006 | Dent |
| 7,116,979 | B2 | 10/2006 | Backes et al. |
| 7,171,211 | B2 | 1/2007 | Muller |
| 7,302,265 | B1 | 11/2007 | Chalishazar et al. |
| 7,693,521 | B1 | 4/2010 | Ribas et al. |
| 2001/0006514 | A1 | 7/2001 | Park |
| 2002/0039901 | A1 | 4/2002 | Sugimoto |
| 2002/0071403 | A1 * | 6/2002 | Crowe et al. ................ 370/331 |
| 2002/0080743 | A1 | 6/2002 | Morita et al. |
| 2003/0119505 | A1 | 6/2003 | Jou et al. |
| 2003/0224733 | A1 | 12/2003 | Schwarz et al. |
| 2004/0005890 | A1 | 1/2004 | Holma et al. |
| 2004/0038682 | A1 | 2/2004 | Persson et al. |
| 2004/0102167 | A1 | 5/2004 | Shim et al. |
| 2004/0185851 | A1 | 9/2004 | Nagai |
| 2004/0229616 | A1 | 11/2004 | Dutta et al. |
| 2004/0267928 | A1 * | 12/2004 | Petrus ........................ 709/225 |
| 2005/0096053 | A1 | 5/2005 | Liu et al. |
| 2005/0124345 | A1 | 6/2005 | Laroia et al. |
| 2005/0153736 | A1 | 7/2005 | Ganton |

OTHER PUBLICATIONS

M. Benson, H.J. Thomas, "Investigation of the UMTS to GSM handover procedure," IEEE 55th Vehicular Technology Conference, VTC, Spring 2002.

* cited by examiner

METHOD OF SELECTING CARRIER FREQUENCY FOR CALL ORIGINATION

CROSS-REFERENCE TO RELATED APPLICATIONS

This is a division of application Ser. No. 11/081,272, filed Mar. 16, 2005, which application is incorporated herein by reference.

BACKGROUND

1. Field of the Invention

The present invention relates to wireless telecommunications and, more particularly, to a method of selecting a carrier frequency for a mobile station to use when transmitting a call origination message.

2. Description of Related Art

Wireless telecommunications networks typically include a plurality of distinct wireless coverage areas, e.g., "cells" or "sectors," within which mobile stations can wirelessly communicate with the network. In some cases, a base transceiver station (BTS) may provide a single wireless coverage area, e.g., a cell. More typically, however, a BTS provides multiple wireless coverage areas, e.g., by using directional antennas, to provide multiple sectors within a given cell.

Each sector may have allocated to it a distinct set of downlink channels that the BTS uses for transmitting signals to mobile stations and a distinct set of uplink channels that mobile stations may use for transmitting signals to the BTS. The downlink channels may include, for example, a pilot channel, paging channels, and traffic channels. The uplink channels may include, for example, access channels and traffic channels. The uplink and downlink channels may use different carrier frequencies. For example, in the case of code division multiple access (CDMA) wireless communication, the uplink channels for a given sector may all use the same uplink carrier frequency and may be distinguished by different codes. The downlink channels for the given sector may all use the same downlink carrier frequency, i.e., a carrier frequency that is different than that used for the uplink channels, and may be distinguished by different codes.

Increasingly, however, wireless telecommunications networks are using multiple frequency plans in some or all of their sectors in order to provide additional wireless capacity in those sectors. In particular, a given sector may have allocated to it a plurality of uplink carrier frequencies, each with associated uplink channels, and a plurality of corresponding downlink carrier frequencies, each with associated downlink channels. As a result, it is often useful to consider the wireless coverage provided by a network as being divided into a plurality of distinct "sector-carriers." Each "sector-carrier" is associated with a particular geographic area, e.g., a cell or sector, and with a particular set of one or more carrier frequencies. For example, a sector-carrier may have a set of uplink channels that use a particular uplink carrier frequency and a set of downlink channels that use a particular downlink carrier frequency.

The number of different carrier frequencies that are available in a given sector may depend on the configuration of the BTS that provides the wireless coverage in that sector. For example, a BTS may be configured to communicate using two different uplink carrier frequencies and two different downlink carrier frequencies. In that case, each sector that is provided by that BTS may be associated with two sector-carriers: (i) one that uses a first uplink carrier frequency and a first downlink carrier frequency; and (ii) one that uses a second uplink carrier frequency and a second downlink carrier frequency. Moreover, these same carrier frequencies may be used by different BTSs in the network. Thus, two different sector-carriers may be distinguished on the basis of their geographic locations (e.g., they may be associated with different sectors) and/or on the basis of their carrier frequencies (e.g., they may be associated with the same sector but use different carrier frequencies).

A mobile station may be associated with a particular sector-carrier by using or monitoring one or more of its channels. For example, a mobile station that is engaged in a call may be associated with a particular sector-carrier by using an uplink and/or downlink traffic channel of that sector-carrier. When a mobile station is not engaged in a call, e.g., in an idle state, the mobile station may be associated with a particular sector-carrier by monitoring the paging channel of that sector-carrier for messages from the network. The sector-carrier with which a mobile station is associated may change. For example, a handoff from one sector-carrier to another may occur when the mobile station changes its location. Such handoffs may occur when the mobile station is in an idle state, or when the mobile station is engaged in a call.

Once associated with a particular sector-carrier, a mobile station typically uses the access channels of that sector-carrier to transmit messages to the network. For example, to originate a call, the mobile station would typically transmit a call origination message in an access channel of the mobile station's current sector-carrier, i.e., the sector-carrier with which the mobile station is associated in the idle state. Then, if the network receives and is able to validate the call origination message, the network may transmit a channel assignment message to the mobile station via a paging channel of that sector-carrier. However, if multiple carrier frequencies are available at that location, the network may also instruct the mobile station to begin using a different sector-carrier, such as a sector-carrier that uses different uplink and downlink carrier frequencies than the sector-carrier that the mobile station used to transmit the call origination message. For example, in response to a mobile station's call origination message, the network may transmit an extended channel assignment message (ECAM), instructing the mobile station to use a different sector-carrier, with different carrier frequencies, for the call.

As noted above, networks often provide multiple carrier frequencies in certain areas in order to increase the number of traffic channels available, and, thus, increase the network's capacity in that area. However, in order to realize the benefits of using multiple carrier frequencies when a mobile station tries to originate a call, the network must receive the call origination message in the original sector-carrier's access channel and the mobile station must receive the channel assignment message that the network transmits in the original sector-carrier's paging channel. If the original sector-carrier's RF conditions are inadequate, however, then the messages needed to originate the call may not be received. For example, the mobile station may be located in an area with low signal strength from the BTS, or the mobile station may be located in an area with high interference. If, as a result of such poor RF conditions, the network fails to receive the mobile station's call origination message or the mobile station fails to receive the network's channel assignment message, the mobile station's attempt to originate the call may be unsuccessful.

Accordingly, there is a need to provide ways of using multiple frequency plans more efficiently.

SUMMARY

In a first principal aspect, the present invention provides a method of selecting a sector-carrier, from among at least a first sector-carrier and a second sector-carrier, for transmitting a message. The first sector-carrier has first downlink channels, including a first pilot channel and a first paging channel, at a first downlink carrier frequency, and first uplink channels, including a first access channel, at a first uplink carrier frequency. The second sector-carrier has second downlink channels, including a second pilot channel and a second paging channel, at a second downlink carrier frequency, and second uplink channels, including a second access channel, at a second uplink carrier frequency. In accordance with the method, a mobile station measures a first total received power at the first downlink carrier frequency and a first pilot signal level of the first pilot channel. The mobile station measures a second total received power at the second downlink carrier frequency and a second pilot signal level of the second pilot channel. The mobile station selects from among at least the first sector-carrier and the second sector-carrier in accordance with a selection algorithm. The selection algorithm specifies a comparison of the first total received power to the second total received power and a comparison of the first pilot signal level to the second pilot signal level.

In a second principal aspect, the present invention provides a method of selecting a channel for a mobile station to use for transmitting a message. In accordance with the method, the mobile station monitors a current paging channel that is associated with a current pilot channel at a current carrier frequency. At least one candidate carrier frequency distinct from the current carrier frequency is identified. At least one candidate pilot channel, including at least one pilot channel at the at least one candidate carrier frequency, is identified. The mobile station measures received signal strengths of the current carrier frequency and of the at least one candidate carrier frequency. The mobile station also measures pilot signal levels of the current pilot channel and of the at least one candidate pilot channel. The received signal strengths of the current carrier frequency and the at least one candidate carrier frequency are compared, and the pilot signal levels of the current pilot channel and the at least one candidate pilot channel are compared. A carrier frequency that has its received signal strength greater than that of the current frequency is selected, from among the at least one candidate carrier frequency, as a selected carrier frequency. A pilot channel, at the selected carrier frequency, that has its pilot signal level greater than that of the current pilot channel is selected, from among the at least one candidate pilot channel, as a selected pilot channel. The mobile station transmits the message in an access channel associated with the selected pilot channel.

DETAILED DESCRIPTION OF EXEMPLARY EMBODIMENTS

1. Overview

Figure 1:
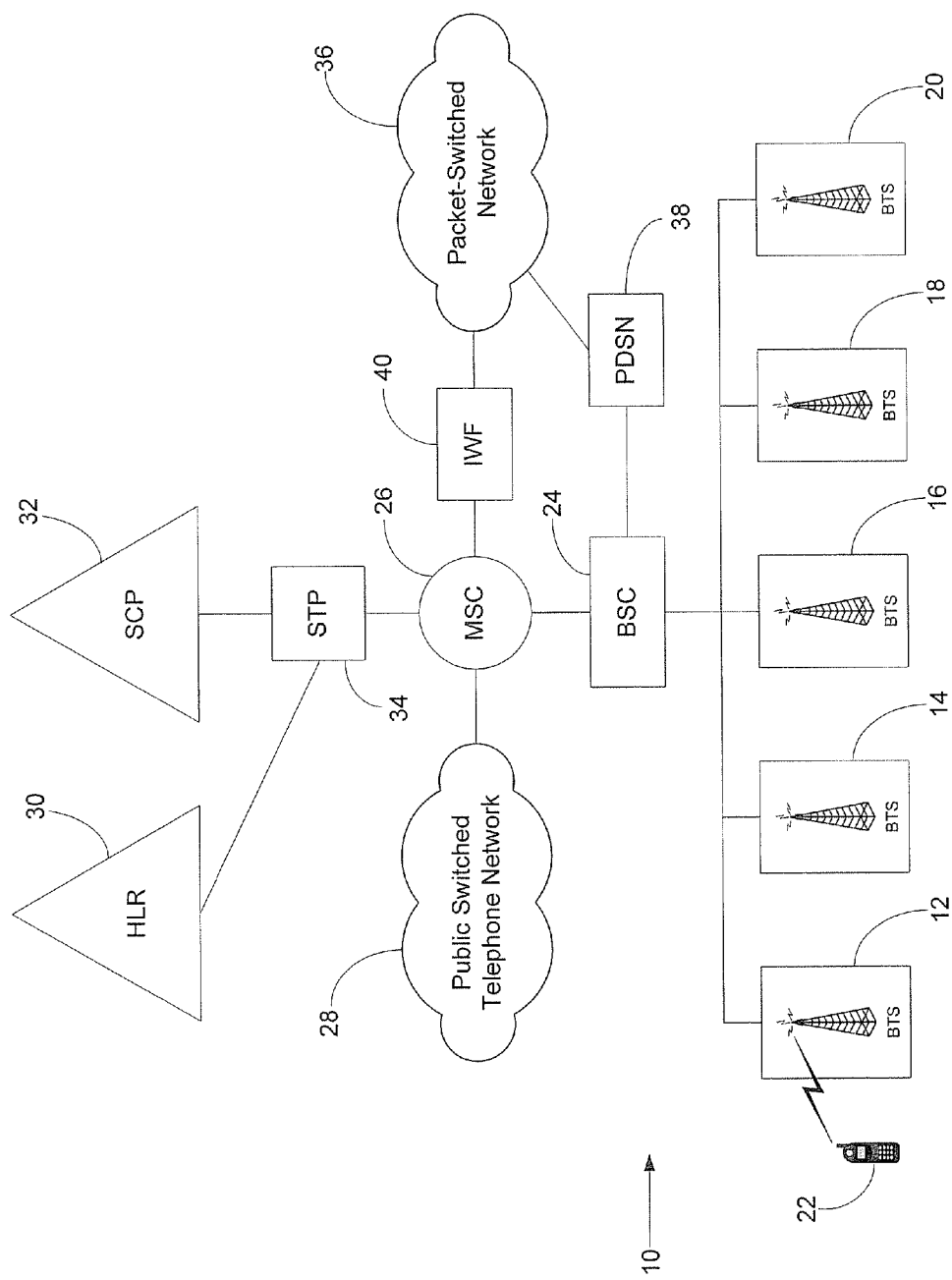
FIG. 1 is a simplified block diagram of a wireless telecommunications network, in accordance with an exemplary embodiment of the present invention.

The present invention, in its exemplary embodiments, beneficially enables more efficient use of multiple frequencies by having a mobile station monitor the RF conditions of multiple sector-carriers to determine which sector-carrier may be optimal for transmitting a message, such as a call origination message. The sector-carriers that the mobile station may monitor may include: (i) the mobile station's current sector-carrier, i.e., the sector-carrier with which the mobile station is associated while in an idle state; and (ii) one or more other, candidate sector-carriers. The candidate sector-carriers may include one or more sector-carriers that use different carrier frequencies than the current sector-carrier. For example, a candidate sector-carrier may be associated with the same sector as the current sector-carrier but use different carrier frequencies. The candidate sector-carriers may also include one or more sector-carriers that use the same carrier frequencies as the current sector-carrier but have distinct pilot channels. For example, a candidate sector-carrier may use the same carrier frequencies as the current sector-carrier but may be associated with a "neighboring" sector.

The RF conditions that the mobile station monitors may include the total received power or received signal strength at a given carrier frequency ($I_0$), the absolute signal level (energy per chip) of a pilot channel ($E_c$), and/or the relative signal level of a pilot channel ($E_c/I_0$). The mobile station may then apply a selection algorithm to select a sector-carrier based on these RF measurements. In accordance with the selection algorithm, the mobile station may compare the total received power at the downlink carrier frequency of its current sector-carrier with that of each of the candidate sector-carriers. The mobile station may also compare the pilot channel signal levels (absolute and/or relative) of its current sector-carrier with that of each of the candidate sector-carriers. If one of the candidate sector-carriers has a total received power that is higher than that of the current sector-carrier and has a pilot channel signal level (absolute and/or relative) that is higher than that of the current sector-carrier, then the mobile station may select that candidate sector-carrier to transmit the message. Otherwise, the mobile station may select its current sector-carrier. The mobile station may then transmit the message in an access channel of the selected sector-carrier. The mobile station may also begin monitoring the paging channel of the selected sector-carrier for messages from the network.

In many cases, the mobile station may select a sector-carrier in this way in order to originate a call. For example, a user may dial digits corresponding to a desired directory number and then actuate a "TALK" or "SEND" button on the mobile station. In response to this user input, the mobile station may measure the RF conditions of the current sector-carrier and one or more candidate sector-carriers and select either the current sector-carrier or a candidate sector-carrier that has "better" RF conditions according to the selection algorithm. Thus, in one example, a candidate sector-carrier may be deemed better if it has both a higher $E_c/I_o$ and a higher $I_o$ than the current sector-carrier. In another example, a candidate sector-carrier may be deemed better if it has $E_c/I_o$, $E_c$ and $I_o$ that are all higher than the current sector-carrier. Alternatively, other criteria could be used to select a sector-carrier.

The mobile station may then use an access channel of the selected sector-carrier to transmit a call origination message to the network. In response, the network may transmit a message to the mobile station, e.g., via the paging channel of the selected sector-carrier, that may either accept or deny the mobile station's request to use the selected sector-carrier. If the network accepts the mobile station's selection, the network may instruct the mobile station to use particular traffic channels allocated to the selected sector-carrier (e.g., a particular uplink traffic channel to transmit voice, data, or other media and a particular downlink traffic channel to receive the voice, data, or other media for the call). However, if the network does not accept the mobile station's request, the network may instruct the mobile station to use particular traffic channels allocated to a non-selected sector-carrier. The non-selected sector-carrier could be, for example, the mobile station's original, idle-state sector-carrier or a candidate sector-carrier that the mobile station did not select for the call origination request.

By attempting to find what sector-carrier has optimal RF conditions, in accordance with the exemplary embodiments described herein, a mobile station may beneficially be able to originate calls or transmit other messages more reliably.

2. Exemplary Architecture

Referring to the drawings, FIG. 1 is a simplified block diagram of an exemplary wireless telecommunications network 10 in which exemplary embodiments of the present invention may be employed. Wireless telecommunications network 10 includes a plurality of base transceiver stations (BTSs) 12, 14, 16, 18, and 20, each of which provides a wireless coverage area within which the BTS may communicate with one or more mobile stations, such as mobile station 22, over an air interface. Mobile station 22 may be a wireless telephone, a wireless personal digital assistant (PDA), a wirelessly equipped laptop computer, or other wireless communication device. The communications between a BTS, such as BTS 12, and mobile station 22 may occur in a digital format, such as CDMA, TDMA, or GSM. Preferably, CDMA is used. Applicable CDMA formats are described, for example, in TIA/EIA/IS-95-B (published Oct. 31, 1998) and in TIA/EIA/IS-2000 Series, Rev. A-2 (published April 2002), which are incorporated herein by reference.

BTSs 12, 14, 16, 18, and 20 may be controlled by a base station controller (BSC) 24, which, in turn, may be controlled by a mobile switching center (MSC) 26. MSC 26 is connected to the public switched telephone network (PSTN) 28 and may use a signaling system, such as SS7, to route calls through PSTN 28. MSC 26 may also be able to signal to a home location register (HLR) 30 and to a service control point (SCP) 32. This signaling may occur via one or more signal transfer points (STPs), such as, for example, STP 34. The signaling between MSC 26 and HLR 30 may conform to IS-41 specifications. A recent revision of the IS-41-specifications, ANSI/TIA/EIA-41-D-97, published in December 1997, is incorporated herein by reference. The signaling between MSC 26 and SCP 32 may conform to the specification "Wireless Intelligent Network," TIA/EIA/IS-771, published Aug. 1, 2001, which is incorporated herein by reference. Other signaling protocols could be used, however. In this way, MSC 26, BSC 24, and BTS 12 may connect incoming calls from PSTN 28, which may originate from landline telephones, mobile stations, or other communication devices, to mobile stations in the wireless coverage area of BTS 12, such as mobile station 22. Similarly, MSC 26, BSC 24, and BTS 12 may connect calls originating from mobile station 22 to their destinations, via PSTN 28.

Although FIG. 1 shows BSC 24 connected to five BTSs, in general, BSC 24 may be connected to a greater or fewer number of BTSs. In addition, although FIG. 1 shows BTSs 12, 14, 16, 18, 20 all connected to the same BSC, in general, these BTSs could be connected to different BSCs. Similarly, although FIG. 1 shows MSC 26 connected to one BSC, in general, MSC 26 may be connected to more than one BSC. Other variations are possible as well.

Mobile station 22 may also be able to access a packet-switched network 36, such as the Internet. For example, mobile station 22 may access packet-switched network 36 for e-mail, wireless web browsing, instant messaging, or "push-to-talk" teleconferencing. To provide access to packet-switched network 36, BSC 24 may include a packet control function (PCF), and a packet data serving node (PDSN) 38 may connect BSC/PCF 24 to packet-switched network 36. The communications between BSC/PCF 24, MSC 26, and PDSN 38 may conform to "third generation" (3G) specifications. Examples of such 3G specifications include "Wireless IP Network Standard," 3GPP2 P.S0001-A, dated Jul. 16, 2001 and "3GPP2 Access Network Interfaces Interoperability Specification," 3GPP2 A.S0001-A, dated June 2001, which are incorporated herein by reference.

In an alternative approach for providing access to packet-switched network 36, MSC 26 may be connected to packet-switched network 36 via an interworking function (IWF) 40. MSC 26 and IWF 40 may allow mobile stations, such as mobile station 22, to access packet-switched network 36 in circuit-switched data (CSD) sessions.

Figure 2:
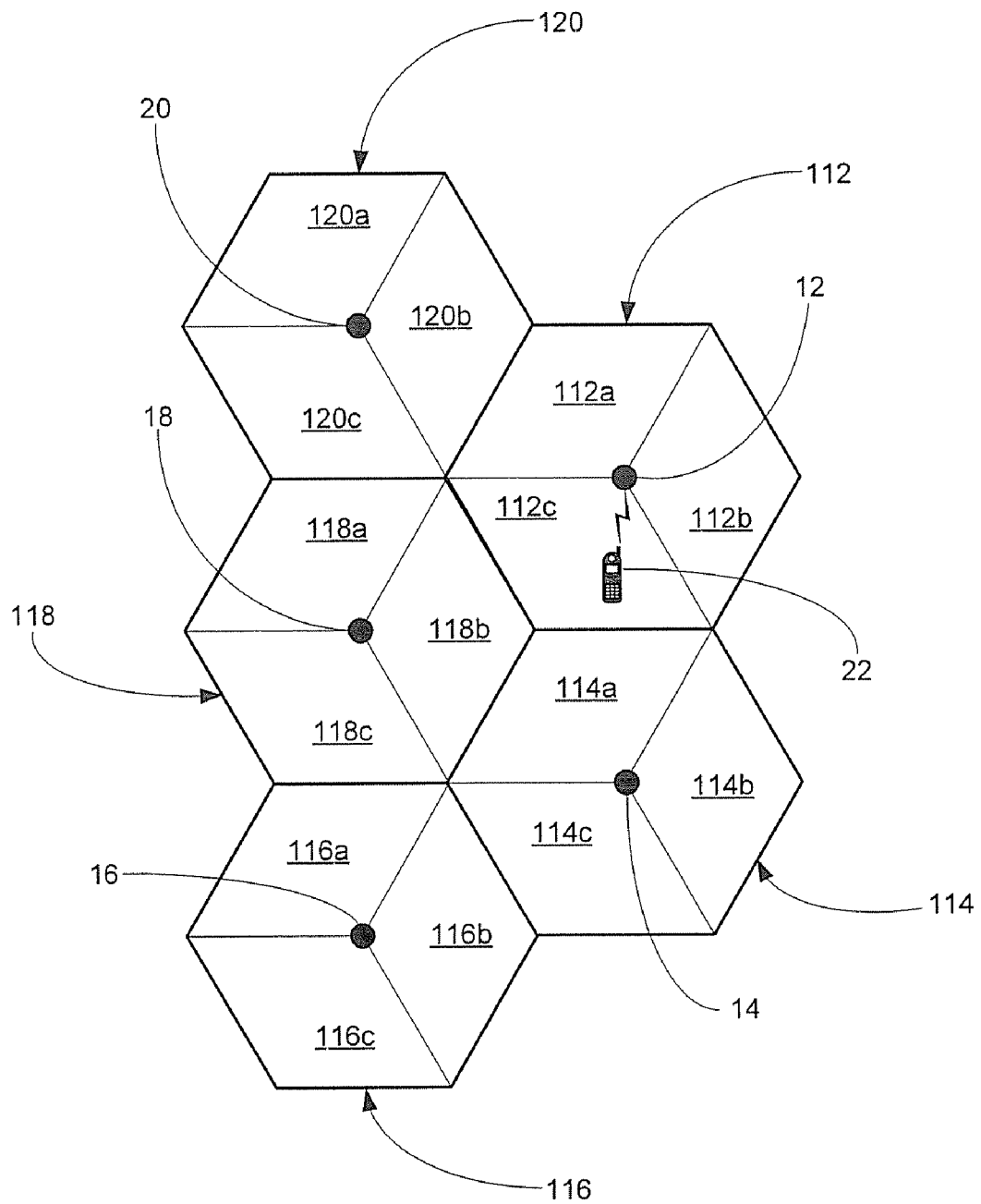
FIG. 2 is a schematic diagram showing the wireless coverage areas provided by the wireless telecommunications network of FIG. 1, in accordance with an exemplary embodiment of the present invention.

FIG. 2 schematically illustrates the wireless coverage areas provided by BTSs 12, 14, 16, 18, and 20 in accordance with an exemplary embodiment. Such wireless coverage areas may include cells and/or sectors. FIG. 2 shows BTSs 12-20 located in cells 112-120, respectively. In addition, in this exemplary embodiment, each BTS provides three sectors in each cell, such as by using directional antennas. Each sector shown in FIG. 2 is identified by the number identifying the cell, with either an "a", "b", or "c" appended thereto. In this way, wireless telecommunications network 10 provides sectors 112a through 120c, as shown in FIG. 2.

As will be apparent to those of ordinary skill in the art, FIG. 2 illustrates wireless sectors 112a through 120c in only a highly idealized fashion. In practice, the geographic extent of sectors 112a through 120c may be very different than shown in FIG. 2. For example, while sectors 112a through 120c are generally contiguous, they may overlap to some extent, such that, in many locations, a mobile station can communicate in more than one sector. Thus, sectors 112a through 120c shown in FIG. 2 are more representative of areas of optimal wireless communication.

In the example shown in FIG. 2, mobile station 22 is associated with sector 112c that is provided by BTS 12. However, because of the overlapping wireless coverage described above, mobile station 22 may also be able to communicate using one or more neighboring sectors. As described in more detail below, mobile station 22 may have a neighbor list that identifies such neighboring sectors, e.g., by their pilot channels. For example, with mobile station 22 located in sector 112c, a neighbor list might define sectors 112a, 112b, 118b, and 114a as neighboring sectors. Mobile station 22 may obtain its neighbor list from neighbor list messages or extended neighbor list messages transmitted by network 10.

Each sector may have allocated to it a plurality of downlink channels that use a downlink carrier frequency and a plurality of uplink channels that use an uplink carrier frequency. The downlink channels might include, for example, a pilot channel, a paging channel, and a plurality of forward traffic channels. The uplink channels might include, for example, a plurality of access channels and a plurality of reverse traffic channels. The various downlink channels and uplink channels may be distinguished by different codes, in the case of CDMA operation, or by different time slots, in the case of TDMA or GSM operation.

Figure 3:
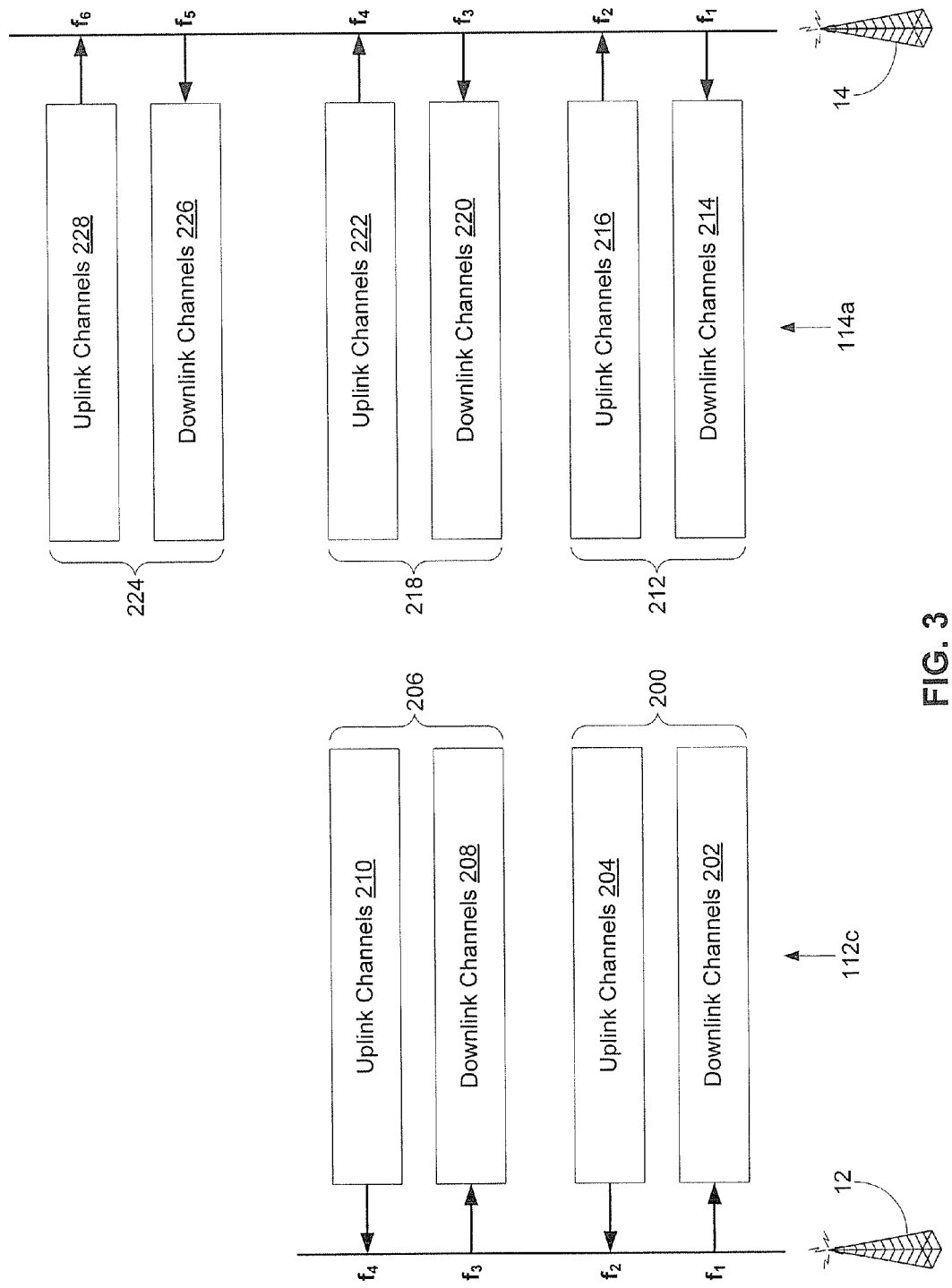
FIG. 3 is a schematic diagram illustrating the downlink and uplink channels in two of the neighboring sectors in FIG. 2, in accordance with an exemplary embodiment of the present invention.

Moreover, some or all of the sectors may use multiple frequency plans, i.e., multiple downlink carrier frequencies and multiple uplink carrier frequencies. FIG. 3 schematically illustrates an example in which sectors 112c and 114a use multiple frequency plans. As shown in FIG. 3, sector 112c, provided by BTS 12, includes two sector-carriers: (i) sector-carrier 200 that has downlink channels 202 and uplink channels 204; and (ii) sector-carrier 206 that has downlink channels 208 and uplink channels 210. Thus, in this example, sector 112c uses two sets of carrier frequencies. In particular, downlink channels 202, uplink channels 204, downlink channels 208, and uplink channels 210 may use carrier frequencies $f_1$, $f_2$, $f_3$, and $f_4$, respectively.

As shown in FIG. 3, sector 114a, provided by BTS 14, includes three sector-carriers: (i) sector-carrier 212 that has downlink channels 214 and uplink channels 216; (ii) sector-carrier 218 that has downlink channels 220 and uplink channels 222; and (iii) sector-carrier 224 that has downlink channels 226 and uplink channels 228. Thus, in this example, sector 114a uses three sets of carrier frequencies. In particular, downlink channels 214, uplink channels 216, downlink channels 220, uplink channels 222, downlink channels 226, and uplink channels 228 may use carrier frequencies $f_1$, $f_2$, $f_3$, $f_4$, $f_5$, and $f_6$, respectively.

As this example illustrates, some of the downlink channels and uplink channels in neighboring sectors may use the same carrier frequencies. Thus, in the example illustrated in FIG. 3, sector-carriers 200 and 206 in sector 112c use the same carrier frequencies as sectors-carriers 212 and 218, respectively, in sector 114a. In CDMA systems, this may be accomplished by the use of different codes in neighboring sectors. However, some sectors may use carrier frequencies that are not used in neighboring sectors. Thus, in the example illustrated in FIG. 3, sector-carrier 224 in sector 114a uses carrier frequencies $f_5$ and $f_6$, which are not used in sector 112c. This may occur, for example, when BTS 14 is configured to use frequencies $f_5$ and $f_6$ but BTS 12 is not.

3. Exemplary Operation

Figure 4:
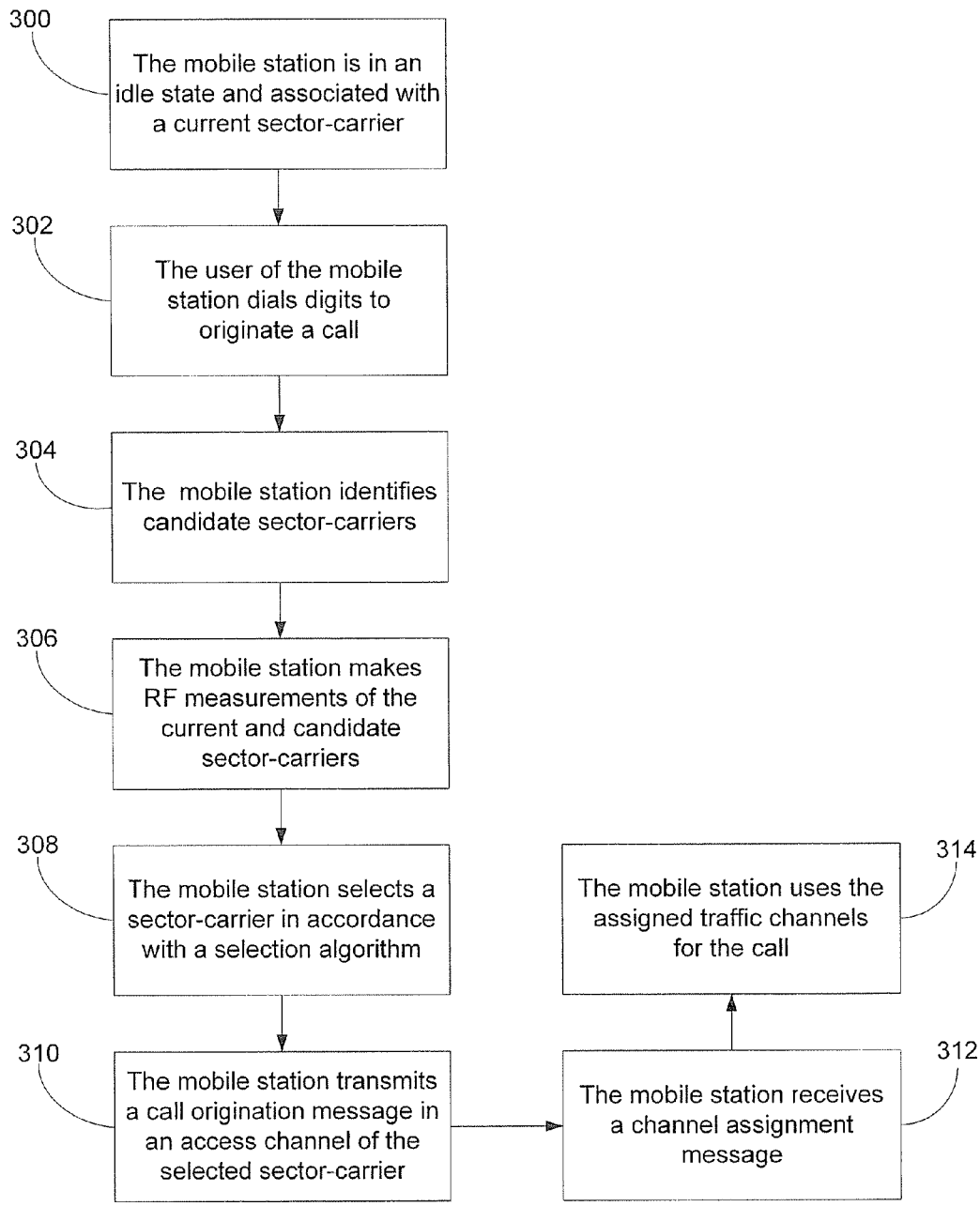
FIG. 4 is a flow chart illustrating a method for selecting a sector-carrier to use to transmit a call origination message, in accordance with an exemplary embodiment of the present invention.

An exemplary operation is illustrated in FIG. 4. In this example, the mobile station selects a sector-carrier, in response to user input, to use to transmit a call origination message. It is to be understood, however, that the mobile station may follow a similar procedure to select a sector-carrier to use to transmit other types of messages. Moreover, the mobile station may transmit such messages in response to user input, in response to instructions from the wireless network, or for some other reason. For purposes of illustration, FIG. 4 assumes a CDMA air interface, i.e., different channels being identified by different codes. However, a similar process could be applied to the case when different channels are distinguished on the basis of time slots, or in other ways.

With reference to FIG. 4, the process may begin with the mobile station in an idle state and associated with a current sector-carrier, as indicated by block 300. For example, the mobile station may be associated with sector-carrier 200 in sector 112c, as shown in FIGS. 2 and 3. In this idle state, the mobile station is not engaged in a call and is not using traffic channels of sector-carrier 200. However, the mobile station may be associated with sector-carrier 200 in that the mobile station is monitoring a paging channel of sector-carrier 200. Thus, the wireless network can reach mobile station, e.g., to notify the mobile station of an incoming call or to provide other information or commands to the mobile station, by transmitting messages over the paging channel of sector-carrier 200.

At some point, the user of the mobile station dials digits to originate a call, as indicated by block 302. In some cases, the user may place a call by interacting with a user interface of the mobile station. The user interface may include, for example, a keypad, buttons, a touch screen, or other controls. Thus, to place a call, may enter digits using a keypad and then actuate a "TALK" or "SEND" button. Alternatively, the user may use voice-activated dialing to place a call by voicing instructions to the mobile station, without physically contacting a user interface.

In response to the user's instruction to originate a call, the mobile station may identify one or more "candidate" sector-carriers, as indicated by block 304. A candidate sector-carrier has a downlink carrier frequency and/or a pilot channel code that is different from that of the mobile station's current sector-carrier. The mobile station may construct a list of candidate sector-carriers by identifying candidate carrier frequencies and candidate pilot channels. The candidate carrier frequencies may include the current carrier frequency (i.e., the downlink carrier frequency of the mobile station's current sector-carrier) and at least one carrier frequency distinct from the current carrier frequency. The candidate pilot channels may include: (i) pilot channels that have different codes than the current pilot channel (i.e., the pilot channel of the mobile station's current sector-carrier); and (ii) pilot channels that have the same code as the current pilot channel (i.e., in the same sector as the mobile station's current sector-carrier) but use different carrier frequencies.

The mobile station may identify candidate carrier frequencies by referring to a carrier frequency list and may identify candidate pilot channels by referring to a neighbor list. The carrier frequency list may specify the carrier frequencies that the mobile station can use to transmit and receive, e.g., based on the mobile station's hardware, software, and/or authorizations. The carrier frequency list may be included in the software or firmware of the mobile station when it is provided to the user. Alternatively, the list of useable carrier frequencies may be provisioned into the mobile station at a later time, for example, as a result of communication with the wireless network.

With reference to FIG. 3, an exemplary carrier frequency list might identify frequencies $f_1$, $f_3$, and $f_5$ as the downlink carrier frequencies that the mobile station can receive and frequencies $f_2$, $f_4$, and $f_6$ as the uplink carrier frequencies that the mobile station can transmit. From this list, the mobile station might select all of the identified downlink carrier frequencies as candidates, i.e., $f_1$, $f_3$, and $f_5$. Alternatively, the mobile station might identify only a subset as candidate carrier frequencies. Although the carrier frequency list in this example identifies three downlink carrier frequencies and three uplink frequencies, it is to be understood that a carrier frequency list could identify a greater or fewer number of carrier frequencies.

The neighbor list that the mobile station uses may be based on one or more neighbor list messages and/or extended neighbor list messages that the wireless network previously transmitted to the mobile station. The neighbor list may identify the pilot channels, such as by code, of "neighboring" sectors. In some cases, the neighbor list may specify carrier frequencies as well, so as to identify "neighboring" sector-carriers. With reference to FIG. 2, when the mobile station is in sector 112c, an exemplary neighbor list might identify the pilot channels (either with or without also specifying carrier frequencies) used in sectors 112a, 112b, 114a, and 118b. The mobile station may then identify all of the pilot channels in the neighbor list as candidates. Alternatively, the mobile station might identify only a subset as candidates. In some embodiments, the mobile station might not identify any pilot channels from neighboring sectors as candidates, but, instead, identify only pilot channels in the mobile station's current sector as candidates.

After identifying the candidate carrier frequencies and candidate pilot channels, the mobile station may identify as a candidate sector-carrier: (i) any sector-carrier that is in its current sector (and, thus, has the same pilot channel code) but uses a candidate carrier frequency distinct from the current carrier frequency; and (ii) any sector-carrier that has a pilot channel code identified in the neighbor list and uses a candidate carrier frequency. Thus, even though the mobile station may have received from the wireless network an extended neighbor list message that specifies carrier frequencies of neighboring sector-carriers, the mobile station may not necessarily limit itself to those carrier frequencies. The mobile station may also identify as candidates neighboring sector-carriers that have other carrier frequencies on the mobile station's carrier frequency list.

In this example, in which the mobile station is in sector 112c and associated with sector-carrier 200 with downlink carrier frequency $f_1$, the mobile station might identify candidate sector-carriers based on downlink carrier frequencies $f_1$, $f_3$, and $f_5$ being identified in its carrier frequency list and based on neighboring sectors 112a, 112b, 114a, and 118b being identified as neighboring sectors in its neighbor list. Thus, with reference to FIG. 3, the mobile station may identify as candidate sector-carriers: (i) sector-carrier 206 in sector 112c; (ii) sector-carriers 212, 218, and 224 in sector 114a; and (iii) one or more sector-carriers in each of sectors 112a, 112b, and 118b.

The mobile station then makes RF measurements of the current and candidate sector-carriers, as indicated by block 306. The RF measurements may include the total received power or received signal strength at a given carrier frequency ($I_0$), the absolute signal level (energy per chip) of a pilot channel ($E_c$), and/or the relative signal level of a pilot channel ($E_c/I_0$). For example, the mobile station may measure $I_0$ for the current carrier frequency and for all other candidate carrier frequencies and may measure $E_c$ for the current pilot channel and for all of the candidate pilot channels. The mobile station may then calculate $E_c/I_0$ for the current pilot channel and for all of the candidate pilot channels.

The mobile station then uses the results of these RF measurements to select a sector-carrier in accordance with a selection algorithm, as indicated by block 308. As described in more detail below, an exemplary selection algorithm may specify: (i) a comparison of $I_0$ for the candidate carrier frequencies distinct from the current carrier frequency to that of the current carrier frequency; and (ii) a comparison of the signal level (either in absolute terms, as in $E_c$, or in relative terms, as in $E_c/I_0$) of the candidate pilot channels to that of the current pilot channel. Thus, a candidate sector-carrier may be selected if it has $I_0$ greater than that of the current carrier frequency and has $E_c/I_0$ greater than that of the current pilot channel. If no candidate sector-carrier meets these criteria, then the mobile station may select the current sector-carrier.

After the sector-carrier is selected, the mobile station transmits the call origination message in an access channel of the selected sector-carrier, as indicated by block 310. The mobile station may then receive a channel assignment message from the wireless network in response to the call origination message, as indicated by block 312. The channel assignment message may indicate whether the wireless network accepts the mobile station's selected sector-carrier. In particular, the channel assignment message may instruct the mobile station to use traffic channels that are in the selected sector-carrier, thereby indicating the network's acceptance of the mobile station's selection. In some cases, however, the wireless network may not accept the mobile station's selection, e.g., because of a lack of available traffic channels in that sector-carrier, load balancing considerations, or for some other reason. In such cases, the channel assignment message may instruct the mobile station to use traffic channels in a sector-carrier that the mobile station did not select for the call origination message. Whether or not the network accepts the mobile station's sector-carrier selection, the mobile station proceeds by using the traffic channels that the network assigned for the call, as indicated by block 314.

Figure 5:
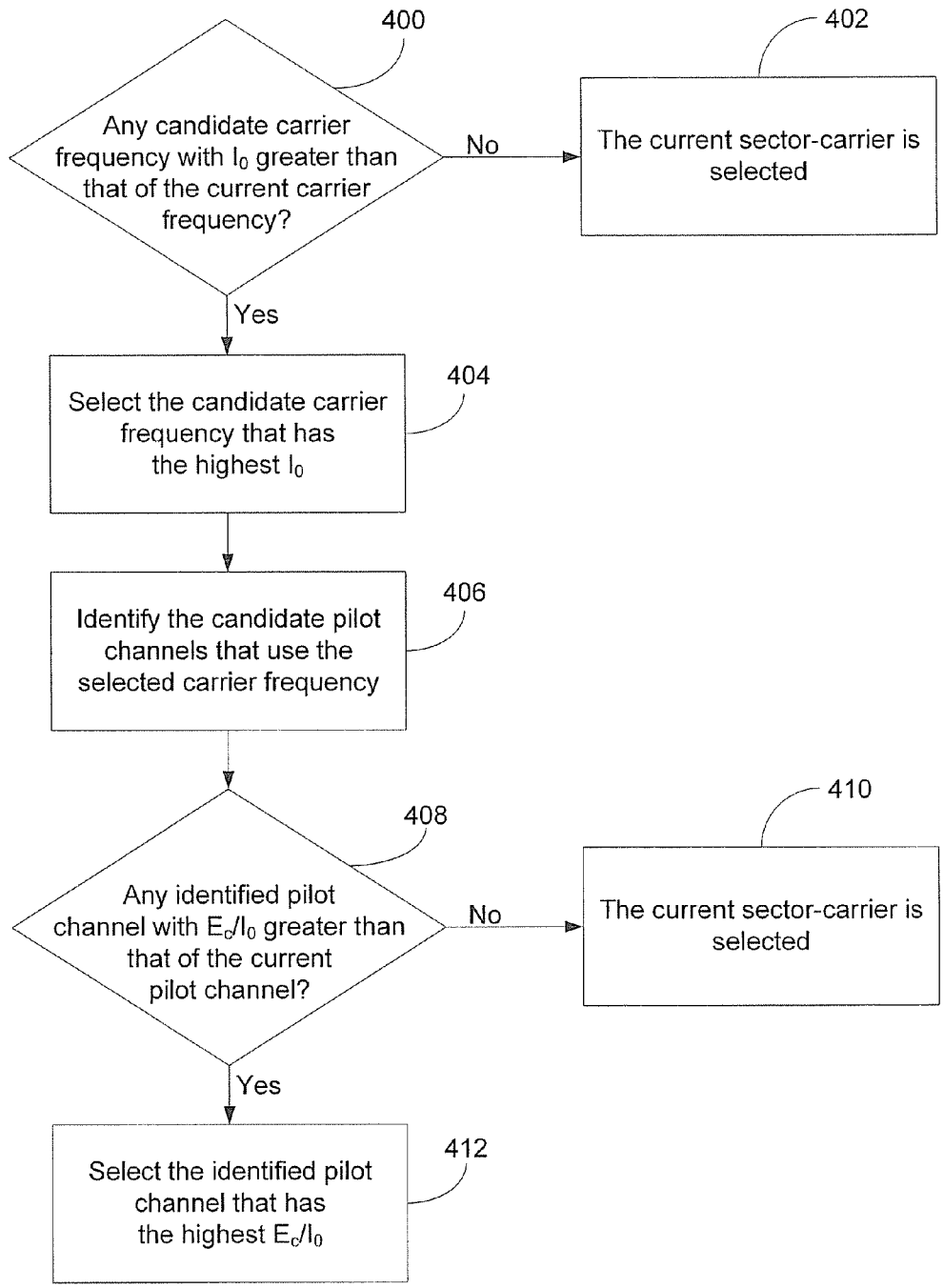
FIG. 5 is a flow chart illustrating a selection algorithm, in accordance with an exemplary embodiment of the present invention.

FIG. 5 illustrates an exemplary selection algorithm, which may correspond to block 308 in FIG. 4. In this example, the comparison between the current sector-carrier and the candidate sector-carriers is made based on $I_0$ and $E_c/I_0$. However, it is to be understood, that the comparison could alternatively be made based on $I_0$ and $E_c$, based on $I_0$, $E_c/I_0$, and $E_c$, or based on other types of RF measurements.

With reference to FIG. 5, the selection algorithm may first determine whether any candidate carrier frequency was found to have $I_0$ greater than that of the current carrier frequency (the carrier frequency of the mobile station's current sector-carrier), as indicated by block 400. If no candidate carrier frequency meets this criterion, then the mobile station may select the current sector-carrier, as indicated by block 402. If, however, one or more candidate carrier frequencies do have $I_0$ greater than that of the current carrier frequency, then the mobile station may select the candidate carrier frequency with the highest $I_0$, as indicated by block 404. In this example, a candidate carrier frequency is required to have $I_0$ that is simply greater than that of the current carrier frequency in order to be selected. Alternatively, the selection algorithm could require $I_0$ for the candidate carrier frequency to be greater than $I_0$ of the current carrier frequency by at least a predetermined amount in order to be selected.

Once a candidate carrier frequency is selected, the mobile station may then identify those candidate pilot channels that use this selected carrier frequency, as indicated by block 406. The selection algorithm may then determine whether any of those identified pilot channels (i.e., pilot channels that use the selected carrier frequency) has an $E_c/I_0$ that is greater than that of the current pilot channel, as indicated by block 408. If none of the identified pilot channels meets this criterion, then the current sector-carrier is selected, as indicated by block 410. If, however, one or more identified pilot channels do have $E_c/I_0$ greater than that of the current pilot channel (the pilot channel of the current sector-carrier), then the mobile station may select the identified pilot channel that has the highest $E_c/I_0$, as indicated by block 412. Alternatively, instead of requiring a pilot channel's $E_c/I_0$ to be simply greater than that of the current pilot channel to be selected, the selection algorithm could require a pilot channel's $E_c/I_0$ to be greater than that of the current pilot channel by at least a predetermined amount in order to be selected.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for a mobile station, said method comprising:
    said mobile station monitoring a current paging channel that is associated with a current pilot channel at a current carrier frequency;
    said mobile station receiving input from a user; and
    in response to said input, said mobile station:
        identifying at least one candidate carrier frequency distinct from said current carrier frequency;
        identifying at least one candidate pilot channel, wherein said at least one candidate pilot channel includes at least one pilot channel at said at least one candidate carrier frequency;
        measuring received signal strengths of said current carrier frequency and of said at least one candidate carrier frequency;
        measuring pilot signal levels of said current pilot channel and of said at least one candidate pilot channel;
        comparing said received signal strengths of said current carrier frequency and said at least one candidate carrier frequency;
        comparing said pilot signal levels of said current pilot channel and said at least one candidate pilot channel;
        selecting a selected carrier frequency, from among said at least one candidate frequency, that has its received signal strength greater than that of said current carrier frequency;
        selecting a selected pilot channel at said selected carrier frequency, from among said at least one candidate pilot channel, that has its pilot signal level greater than that of said current pilot channel; and
        transmitting a message in an access channel associated with said selected pilot channel.

2. The method of claim 1, wherein said pilot signal levels are absolute signal levels.

3. The method of claim 1, wherein said pilot signal levels are relative signal levels.

4. The method of claim 1, wherein identifying at least one candidate carrier frequency distinct from said current carrier frequency comprises said mobile station referring to a carrier frequency list.

5. The method of claim 1, wherein identifying at least one candidate pilot channel comprises said mobile station referring to a neighbor list.

6. The method of claim 1, wherein said input comprises an instruction to originate a call.

7. The method of claim 6, wherein said message is a call origination message.

* * * * *